Oct. 11, 1938.  A. J. LARRECQ  2,133,146
FLANGED JOINT
Filed Aug. 13, 1937
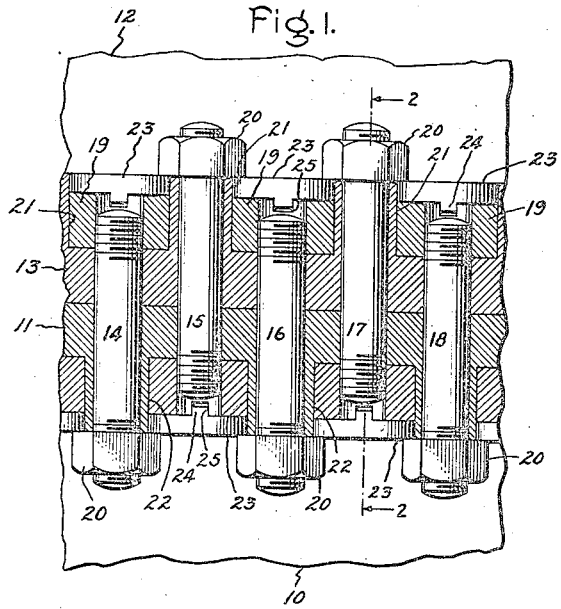
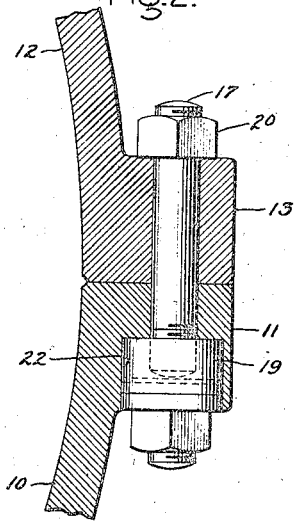
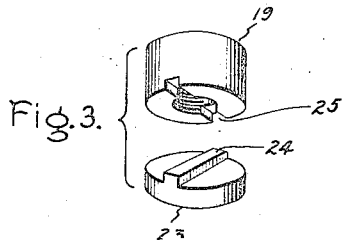
Inventor:
Anthony J. Larrecq,
by Harry E. Dunham
His Attorney.

Patented Oct. 11, 1938

2,133,146

UNITED STATES PATENT OFFICE 2,133,146

FLANGED JOINT

Anthony J. Larrecq, Beach Bluff, Mass., assignor to General Electric Company, a corporation of New York Application August 13, 1937, Serial No. 158,925

1 Claim. (Cl. 220—75)

The present invention relates to flanged joints, that is, to arrangements for securing two elements such as conduits or turbine casing portions together by means of flanges forming parts of such elements and a plurality of bolts disposed in openings of the flanges. At times when the conduits or casings are subjected to considerable stresses, as for instance in an elastic fluid turbine subjected to high pressures and temperatures, it becomes necessary to fasten together the flanges by as many bolts as possible. In the ordinary bolted flange arrangement the number of bolts which may be provided is limited by the diameter or maximum width of the nuts and heads of such bolts.

The object of my invention is to provide an improved flanged joint arrangement in which the aforementioned limitation as to the spacing of adjacent bolts is overcome so that the spacing of adjacent bolts may be reduced to a minimum.

For a consideration of what I believe to be novel and my invention, attention is directed to the following description and the claim appended thereto in connection with the accompanying drawing.

In the drawing, Fig. 1 illustrates a sectional view of a flanged joint embodying my invention; Fig. 2 is a section along the line 2—2 of Fig. 1; and Fig. 3 is a perspective view of a nut or head and a locking member forming part of Fig. 1.

The flanged joint shown by way of example shows a part of an elastic fluid turbine casing having a lower portion 10 with a flange 11 secured to an upper portion 12 with a flange 13 by means of a plurality of bolts 14, 15, 16, 17 and 18. Each bolt has a head 19 and a nut 20. The heads 19 in the present instance are screw-threaded to the bolts proper and disposed within recesses 21 and 22 in the upper and lower flange respectively. Each head 21 is prevented from rotation by the provision of a locking member 23 in the present instance shown in the form of a separate disk with a rib 24 disposed in a slot 25 in the head. In the drawing the heads for the bolts 14, 16 and 18 are disposed in recesses 21 in the upper flange 13 while the heads for the bolts 15, 17 are disposed in recesses 22 in the lower flange 11 or, from another viewpoint, the heads of adjacent bolts are disposed in recesses in the upper and lower flange respectively. Thus, bolt 15 has its head disposed in a recess in the lower flange, whereas bolts 14 and 16 which are adjacent to the bolt 15 have their ends disposed in recesses in the upper flange 13. The nuts 20 and the heads 19 of adjacent bolts overlap each other as regards their spacing. The locking members 23 may be prevented from rotation either by the frictional resistance between these locking members and the adjacent walls of the recesses or by pressure exerted by the nuts of adjacent bolts. Thus, nut 20 of the bolt 14 exerts a pressure onto the locking member 23 pertaining to the head 19 of the bolt 15.

The assembly of the arrangement may be accomplished in several ways. For example, after assembly of the bolt 14 and its nut and locking member the bolt 15 and its nut and locking member are inserted whereupon the nut for the bolt 14 is tightened. Thereafter the head and locking member for bolt 16 is inserted and the nut for bolt 15 tightened.

The dismantling of the flanged joint arrangement is preferably accomplished by first removing the nuts and the bolts and thereupon forcing the bolts through the openings in the flanges. Thus, with my invention I have accomplished an improved construction and arrangement of flanged joints or bolted flanges whereby the number of bolts which may be provided is considerably increased and a safe and secure connection of the flanges thereby attained.

Summarizing, a flanged joint according to my invention comprises a first and a second flanged member which are connected together by a plurality of first and second bolts having heads and nuts. The first and second bolts alternate with each other and the heads of the first bolts are disposed within recesses in the first flanged member so that the nuts of the first bolts overlap the recesses and the heads of the second bolts located in said recesses. Likewise, the nuts of the second bolts overlap the recesses and the heads of the first bolts.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States, is:—

Flanged joint comprising a first and a second flanged member, first and second bolts with heads and nuts securing the flanges together, each first bolt being located intermediate two second bolts, recesses in the first flanged member for receiving the heads of the first bolts and recesses in the second flanged member for receiving the heads of the second bolts, the heads being screw-threaded to the bolts, a locking member for each bolt forced into the recess by the nuts of adjacent bolts.

ANTHONY J. LARRECQ.